United States Patent
Lee et al.

(10) Patent No.: US 9,250,366 B2
(45) Date of Patent: Feb. 2, 2016

(54) DISPLAY STRUCTURE

(71) Applicant: Industrial Technology Research Institute, Hsinchu (TW)

(72) Inventors: Kuo-Chang Lee, Pingtung County (TW); Yu-Hsiang Tsai, Hsinchu County (TW); Mang Ou-Yang, Hsinchu (TW); Ting-Wei Huang, Taipei (TW); Wei-De Jeng, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/511,535

(22) Filed: Oct. 10, 2014

(65) Prior Publication Data

US 2015/0285960 A1    Oct. 8, 2015

(30) Foreign Application Priority Data

Apr. 3, 2014    (TW) .............................. 103112452 A (51) Int. Cl.
*G02B 27/10*    (2006.01)
*G02B 3/00*    (2006.01)
*G02B 1/18*    (2015.01)

(52) U.S. Cl.
CPC ............... *G02B 3/0068* (2013.01); *G02B 1/18* (2015.01)

(58) Field of Classification Search
CPC .................................................. G02B 13/0015
USPC ........................................................ 359/619
See application file for complete search history.

(56) References Cited

U.S. PATENT DOCUMENTS

| | | | |
|---|---|---|---|
| 5,398,125 A | 3/1995 | Willett et al. | |
| 5,680,186 A | 10/1997 | Watanabe et al. | |
| 7,746,559 B2 * | 6/2010 | Sharon et al. | 359/618 |
| 2002/0085287 A1 | 7/2002 | Egawa | |
| 2004/0239851 A1 | 12/2004 | Tsukagoshi et al. | |
| 2005/0041296 A1 * | 2/2005 | Hsiao et al. | 359/619 |
| 2006/0092158 A1 | 5/2006 | Shestak | |

FOREIGN PATENT DOCUMENTS

| | | |
|---|---|---|
| TW | 200720704 | 10/1995 |
| TW | 588195 | 5/2004 |
| TW | 200807029 | 2/2008 |

OTHER PUBLICATIONS

Hsieh, Hsing-Hung et al., "A Transparent AMOLED with On-cell Touch Function Driven by IGZO Thin-Film Transistors," SID 11 Digest, Jun. 2011, pp. 714-717, vol. 42, Issue 1,SID, US.
Hsieh, Hsing-Hung et al., "Transparent AMOLED and Its Integration with an Electrophoretic Display," SID 2012 Digest, Jun. 2012, pp. 698-701, vol. 43, Issue 1, SID, US.

(Continued)

*Primary Examiner* — James Jones (57) ABSTRACT

A display structure is provided. The display structure includes a first substrate, a pixel array, a second substrate and an optical component. The pixel array is disposed on the first substrate. Each of pixels of the pixel array includes a light-transparent region and a non-light-transparent region. The second substrate is disposed on the pixel array. The optical component has a microlens structure. After the light passes through the microlens structure, the light passes directly through the plurality of the light-transparent regions without passing through the edge of the plurality of the non-light-transparent regions.

10 Claims, 6 Drawing Sheets

(56) References Cited

OTHER PUBLICATIONS

Kress, Bernard et al. "Exit Pupil Expander for Wearable See-Through Displays," SPIE, May 2012, 8 pages, vol. 8368, USI Photonics, Inc., US.

Jarvenpaa, Toni et al. "Compact Near-to-Eye Display with Integrated Gaze Tracker," SPIE, Apr. 2008, 8 pages, vol. 7001, Finland.

Song, Young W. et al. "LTPS-Based Transparent AMOLED," SID 10 Digest, May 2010, pp. 144-147, vol. 41, Issue 1, SID, US.

Yeon, Jeongho et al., "A New Reflective-type Transparent Display using Cholesteric Liquid Crystal," SID 10 Digest, May 2010, pp. 838-841, vol. 41, Issue 1, SID, US.

Taiwan Patent Office, Office Action, Patent Application Serial No. 103112452, Jun. 5, 2015, Taiwan.

\* cited by examiner

DISPLAY STRUCTURE

CROSS REFERENCE TO RELATED APPLICATION

The present application is based on, and claims priority from, Taiwan (International) Application Serial Number 103112452, filed Apr. 3, 2014, the disclosure of which is hereby incorporated by reference herein in its entirety.

TECHNICAL FIELD

The disclosure relates to a display structure, and more particularly to a display structure having a microlens structure.

BACKGROUND

A traditional display structure may include a pixel array. The pixel array comprises a light-transparent region and a non-light-transparent region, e.g. the non-light-transparent region can be circuits arranged periodically or Thin-Film Transistors (TFTs). When light enters into the traditional display structure, diffraction occurs and causes image distortion. That is because light will pass through the edge of the non-light-transparent regions. Traditionally, the configuration of the pixel array is changed to reduce the diffraction. However, the effect of the above method is not significant.

SUMMARY

An embodiment of the present disclosure provides a display structure. The display structure includes a first substrate, a pixel array, a second substrate and an optical component. The pixel array is disposed on the first substrate to make each of the pixels of the pixel array include a light-transparent region and a non-light-transparent region. The second substrate is disposed on the pixel array. The optical component has a microlens structure, wherein light passes directly through the plurality of light-transparent regions without passing through the edge of the plurality of non-light-transparent regions after light passes through the microlens structure.

An embodiment of the present disclosure provides a display structure. The display structure includes a first substrate, a pixel array, a second substrate and an optical component. The pixel array, disposed on the first substrate, includes a plurality of sub-pixel arrays, wherein each of the sub-pixel arrays includes at least one pixel, and each of the pixels includes a light-transparent region and a non-light-transparent region. The second substrate is disposed on the pixel array. The optical component is disposed on the second substrate. The optical component includes a surface and a microlens array. Each of the microlenses of the microlens array corresponds to one of the sub-pixel arrays. The vertical distance between the surface of the optical component and each of the non-light-transparent regions is less than twice as long as the focal length of each of the microlenses of the microlens array.

An embodiment of the present disclosure provides a display structure. The display structure includes a first substrate, a pixel array, a second substrate and an optical component. The pixel array is disposed on the first substrate. The pixel array includes a plurality of sub-pixel arrays, wherein each of the sub-pixel arrays includes at least one pixel, and each of the pixels includes a light-transparent region and a non-light-transparent region. The second substrate is disposed on the pixel array. The optical component is disposed on the second substrate. The optical component includes a first plane, a second plane, a first microlens array and a second microlens array. The focal length of at least one microlens of the first microlens array is a first focal length. The focal length of at least one microlens of the second microlens array is a second focal length. The second focal length is less than or equal to the first focal length. Each of the microlenses of the first microlens array corresponds to one of the microlenses of the second microlens array. Each of the microlenses of the second microlens array corresponds to one of the sub-pixels. The distance between the first and second planes is equal to the sum of the first and second focal lengths.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1A:
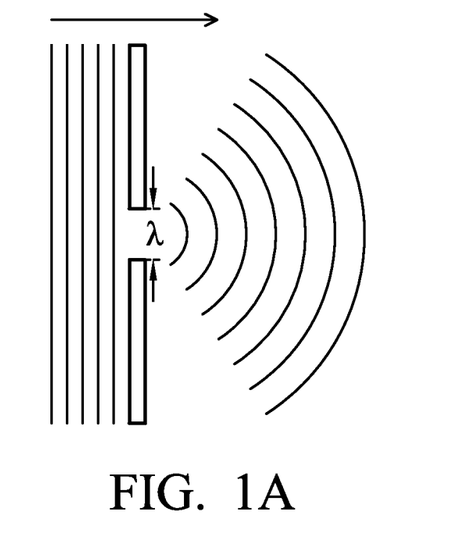
FIG. 1A is a schematic diagram illustrating a point light source passing through a slit.
Figure 1B:
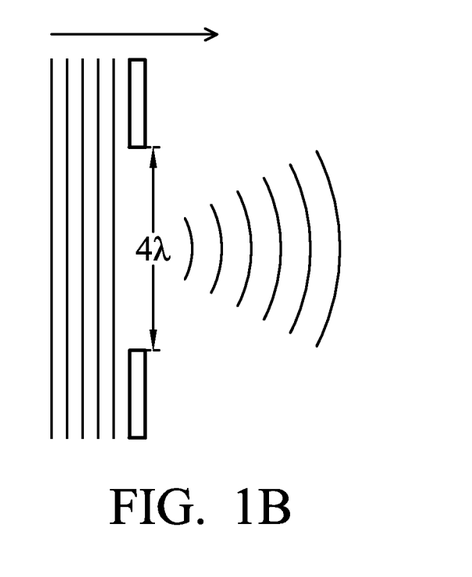
FIG. 1B is a schematic diagram illustrating a point light source passing through a slit.
Figure 1C:
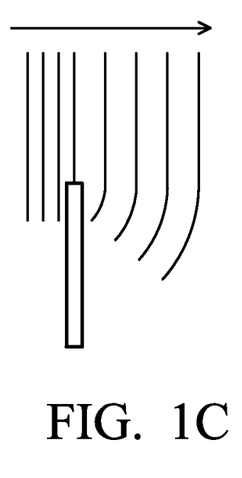
FIG. 1C is a schematic diagram illustrating a point light source passing through the edge of an object.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims FIG. 1A and FIG. 1B are the schematic diagrams illustrating a point light source passing through a slit; the arrow direction indicates the light-propagation direction. The wavelengths of the point light source in FIG. 1A and FIG. 1B are both $\lambda$. The width of the slit shown in FIG. 1A is $\lambda$. The width of the slit shown in FIG. 1B is $4\lambda$. Compared with FIG. 1A and FIG. 1B, the diffraction caused by the point light source is slight when the width of the slit is $4\lambda$. FIG. 1C is a schematic diagram illustrating light from a point light source passing through the edge of an object. In FIG. 1C, the arrow direction indicates the light propagation direction. As shown in FIG. 1C, the diffraction happens when light passes through the edge of the object. Because the width of the light-transparent region (i.e. the slit) of the traditional display structure is much larger than the wavelength of visible light, the diffraction caused by the point light source is not serious. On the contrary, nowaday diffraction is mainly caused by light passing through the edge of the object.

Figure 2:
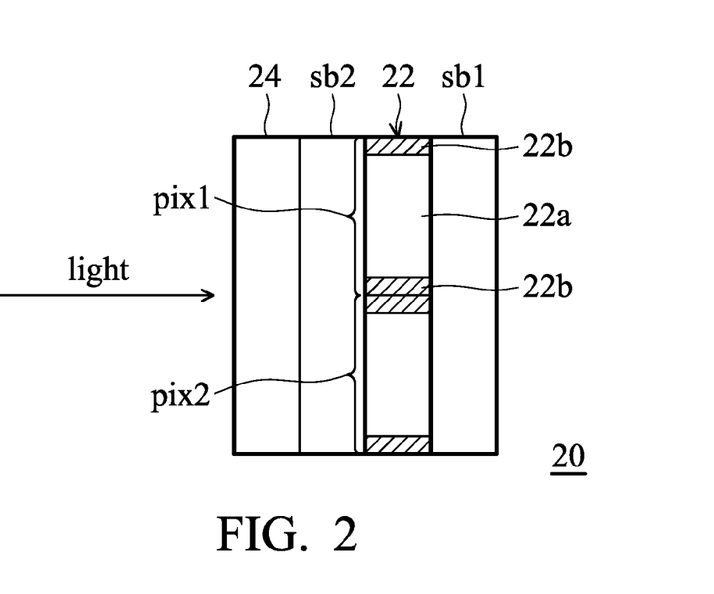
FIG. 2 is a schematic diagram showing light passing through a display structure according to an embodiment of the disclosure.

FIG. 2 is a schematic diagram showing light passing through a display structure according to an embodiment of the disclosure. The display structure 20 includes a first substrate sb1, a pixel array 22, a second substrate sb2 and an optical component 24. The pixel array 22 is disposed on the first substrate sb1. The second substrate sb2 is disposed on the pixel array 22. The pixel array 22 includes a plurality of pixels. To illustrate simply, there are only two pixels shown in FIG. 2 (i.e. pix1 and pix2). Each of the pixels of the pixel array 22 includes a light-transparent region and a non-light-transparent region. Taking the pixel pix1 as an example, the pixel pix1 includes a light-transparent region 22a and a non-light-transparent region 22b. The non-light-transparent region 22b may include an electrode, TFT (Thin-Film Transistor), black matrix or other materials which have a different refractive index than the light-transparent region. The optical component 24 contains a microlens structure. After light passes through the microlens structure, the microlens structure makes light pass directly through the edge of the non-light-transparent regions, wherein the light may be emitted by a backlight panel or a backlight module.

Figure 3:
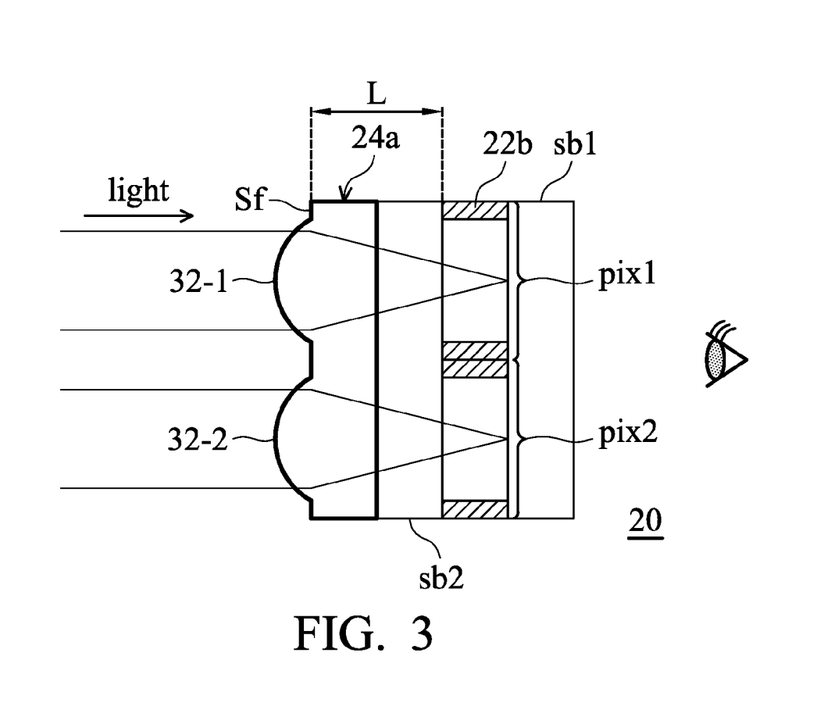
FIG. 3 shows a schematic diagram of light passing through the display structure according to an embodiment of the disclosure.

FIG. 3 shows a schematic diagram of light passing through the display structure according to an embodiment of the disclosure. The difference between the display structures shown in FIG. 2 and FIG. 3 is that the display structure shown in FIG. 3 is only an embodiment of the display structure shown in FIG. 2. To illustrate simply, the following description only focuses on the optical element.

An optical component 24a is disposed on the second substrate sb2. The microlens structure of the optical component 24a is a microlens array. The optical component 24a has a surface sf. The surface sf is the main plane of the microlens array. The microlens array includes a plurality of microlenses. To illustrate simply, there are only two microlenses shown in FIG. 3 (i.e. the microlens 32-1 and the microlens 32-2). Each of the microlenses of the microlens structure corresponds to one of the pixels of the pixel array. For example, the microlens 32-1 is corresponding to the pixel pix1, and the microlens 32-2 is corresponding to the pixel pix2. In order to avoid for light passing through the edge of the non-light-transparent regions, the vertical distance between the surface sf of the optical component 24a and each of the non-light-transparent regions is less than twice as long as the focal length of each of the microlenses of the microlens array. For example, the vertical distance L between the surface sf (i.e. the main plane) and the non-light-transparent region 22b is less than twice as long as the focal length of the microlens 32-1. The focal length of each of the microlenses of the microlens array can be set equally.

The following description describes light passing through the above structure. When light comes into the optical component 24a and goes out through the second substrate sb2, an observer is located at one side of the second substrate sb2 to observe light emitted from the second substrate sb2, wherein the light can be emitted by a backlight panel or a backlight module. In this display structure, light passes through the optical component 24a and then focuses on the light-transparent regions. As a result, light focused on the light-transparent regions does not pass through the edge of the non-light-transparent regions, and the diffraction is reduced thereby. For example, after light passes through the microlens 32-1, light focuses on the corresponding light-transparent region 22a of the pixel pix1 of the microlens 32-1 and will not pass through the edge of the non-light-transparent region 22b of the pixel pix1.

In a specific embodiment, the focal length of the microlens is between 1.0 mm-3.0 mm, 3.0 mm, the lens curvature of the microlens is between 100 µ-10 mm, and the thickness of the microlens is between 100 µm-10 mm. In another specific embodiment, the focal length of the microlens is between 1.5 mm-2.0 mm, the lens curvature of the microlens is between 500 µm-30 mm, and the thickness of the microlens is between 500 µm-30 mm. The material of the microlens can be glass, plastic, optical epoxy resin, photoresist or any combination of the above materials. The above display structure can be a liquid-crystal display (LCD), an organic light-emitting diode (OLED), a cholesteric liquid-crystal display (ChLCD) or an electrowetting display (EWD). In a specific embodiment, the optical component is made of a water-blocking oxide film.

Figure 4A:
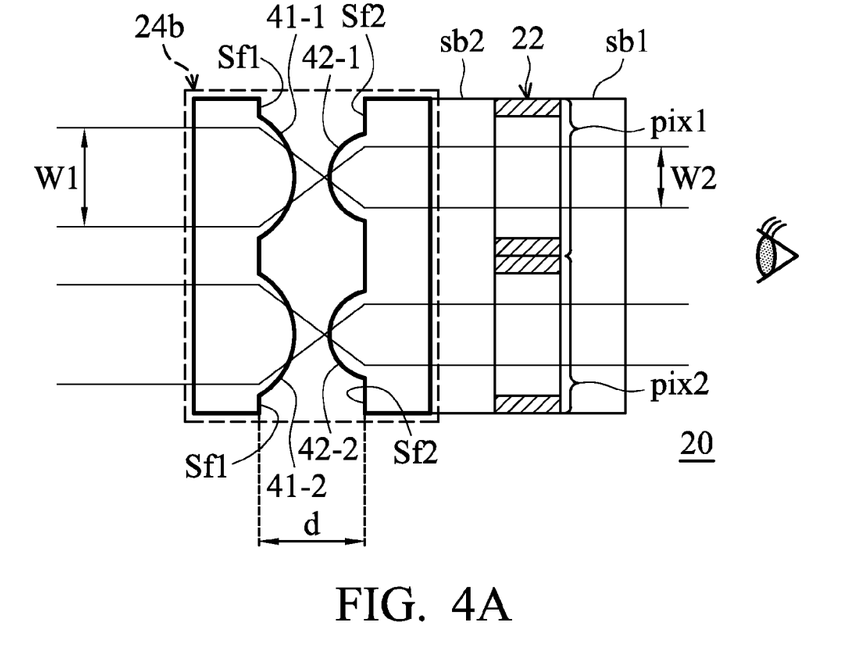
FIG. 4A shows a schematic diagram of light passing through the display structure according to an embodiment of the disclosure.

FIG. 4A shows a schematic diagram of light passing through the display structure according to an embodiment of the disclosure. The difference between the display structures shown in FIG. 2 and FIG. 4A is that the display structure shown in FIG. 4A is only an embodiment of the display structure shown in FIG. 2. To illustrate simply, the following description only focuses on the optical element.

An optical component 24b is disposed on the second substrate sb2. The microlens structure of the optical component 24b includes a first microlens array and a second microlens array. The optical component 24b has a first plane sf1 and a second plane sf2, wherein the first plane sf1 can be the main plane of the first microlens array, and the second plane sf2 can be the main plane of the second microlens array. The first and second microlens arrays both include a plurality of microlenses. To illustrate simply, FIG. 4 only shows the microlenses 41-1 and 41-2 of the first microlens array and the microlenses 42-1 and 42-2 of the second microlens array. The focal length of the at least one microlens 41-1 of the first microlens array is a first focal length f1 mm. The focal length of the at least one microlens 42-1 of the second microlens array is a second focal length f2 mm. The second focal length f2 is less than the first focal length f1. Each of the microlenses of the first microlens array corresponds to one of the microlenses of the second microlens array. For example, the microlens 41-1 of the first microlens array is corresponding to the microlens 42-1 of the second microlens array, and the microlens 41-2 of the first microlens array is corresponding to the microlens 42-2 of the second microlens array. Additionally, each of the microlenses of the second microlens array corresponds to one of the pixels of the pixel array. For example, the microlens 42-1 of the second microlens array is corresponding to the pixel pix1, and the microlens 42-2 of the second microlens array is corresponding to the pixel pix2. It is noticeable that the distance d between the first plane sf1 and the second plane sf2 is equal to the sum of the first focal length f1 and the second focal length f2.

The following description describes the situation that light passing through the above structure. When light comes into the optical component 24b and goes out from the second substrate sb2, an observer locates at one side of the second substrate sb2 for observing light emitted from the second substrate sb2, wherein the light can be emitted by a backlight panel or a backlight module. In this display structure, the focal length of the second microlens array is less than the focal length of the first microlens array. The width W2 of the light emitted from the microlens of the second microlens array is less than the width W1 of the light emitted from the microlens of the first microlens array. Through the way of reducing the width of the light, light come into the pixel array does not pass through the edge of the non-light-transparent regions (i.e. the non-light-transparent region 22b), and the diffraction is reduced thereby.

In a specific embodiment, the focal length of the microlens of the first microlens array is between 1.0 mm-3.0 mm, the lens curvature of the microlens of the first microlens array is between 100 μm-10 mm, the thickness of the microlens of the first microlens array is between 100 μm-10 mm, the focal length of the microlens of the second microlens array is between 1.0 mm-3.0 mm, the lens curvature of the microlens of the second microlens array is between 100 μm-10 mm, and the thickness of the microlens of the second microlens array is between 100 μm-10 mm. In another specific embodiment, the focal length of the microlens of the first microlens array is between 1.5 mm-2.0 mm, the lens curvature of the microlens of the first microlens array is between 500 μm-30 mm, the thickness of the microlens of the first microlens array is between 500 μm-30 mm, the focal length of the microlens of the second microlens array is between 1.5 mm-2.0 mm, the lens curvature of the microlens of the second microlens array is between 500 μm-30 mm, mm, and the thickness of the microlens of the second microlens array is between 500 μm-30 mm. The material of the microlens can be glass, plastic, optical epoxy resin, photoresist or any combination of the above materials. The above display structure can be a LCD, an OLED, a ChLCD or an EWD. In a specific embodiment, the material of the optical component is a water-blocking oxide film.

Figure 4B:
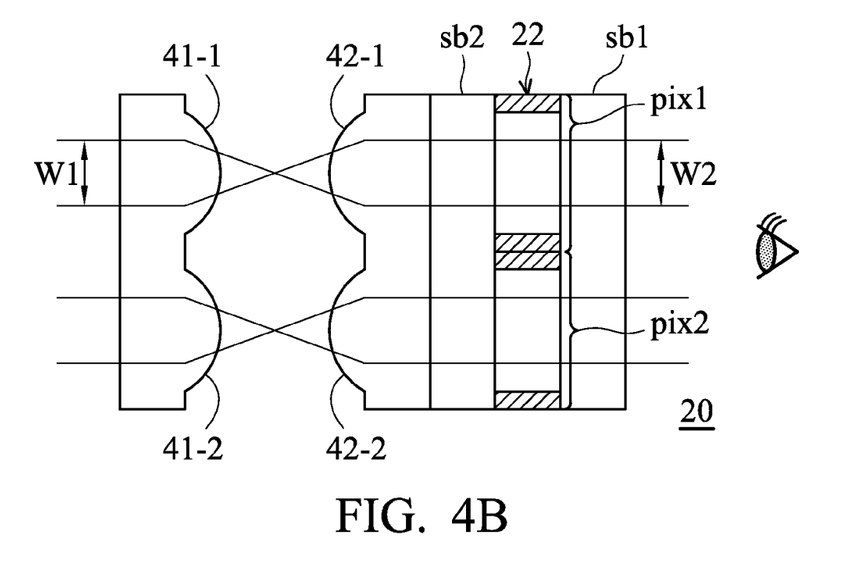
FIG. 4B shows a schematic diagram of light passing through the display structure according to an embodiment of the disclosure.

FIG. 4B shows a schematic diagram of light passing through the display structure according to an embodiment of the disclosure. The difference between the display structures shown in FIG. 4A and FIG. 4B is that, in FIG. 4B, the focal length f1 of the at least one microlens 41-1 of the first microlens array is equal to the focal length f2 of the at least one microlens 42-1 of the second microlens array. In the above display structure, the width W2 of the light emitted from the microlens of the second microlens array is equal to the width W1 of the light emitted from the microlens of the first microlens array.

Figure 5:
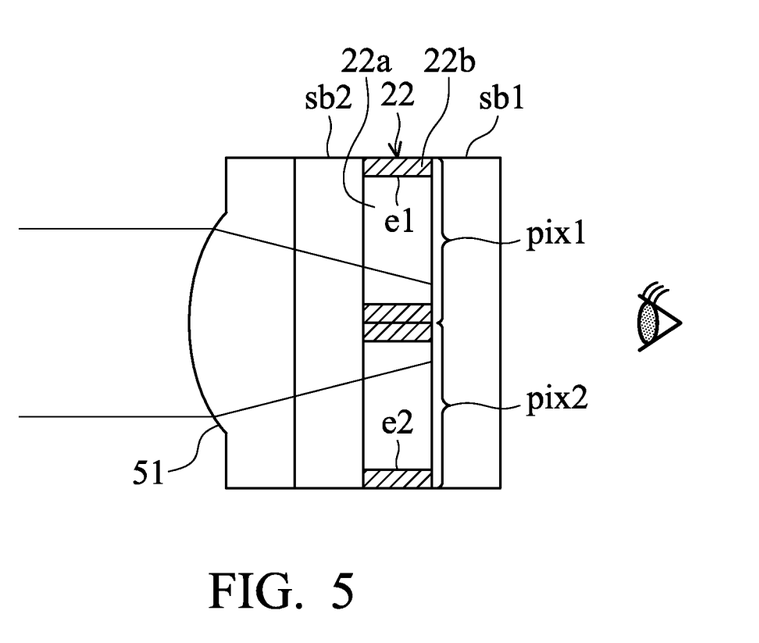
FIG. 5 shows a schematic diagram of light passing through the display structure according to an embodiment of the disclosure.

FIG. 5 shows a schematic diagram of light passing through the display structure according to an embodiment of the disclosure. The difference between the display structures shown in FIG. 3 and FIG. 5 is that, in the embodiment shown in FIG. 5, a pixel array includes a plurality of sub-pixel arrays, wherein each of the sub-pixel arrays includes at least one pixel, and each of the microlenses of the pixel array corresponds to one of the sub-pixel arrays of the pixel array. When each of the sub-pixel arrays only includes a pixel, the display structures shown in FIG. 3 and FIG. 5 are the same. The following description describes each of the sub-pixel arrays including more than two pixels.

Referring to FIG. 5, the sub-pixel array includes two pixels pix1 and pix2. In other words, a microlens 51 is corresponding to the pixels pix1 and pix2. In this display structure, light passes through the microlens 51 and then focuses on the light-transparent region 22a of the pixel pix1 and the light-transparent region 22b of the pixel pix2. As a result, light coming into the light-transparent regions does not pass through the edge e1 of the non-light-transparent region 22a and the edge e2 of the non-light-transparent region 22b, and the diffraction is thereby reduced.

Figure 6A:
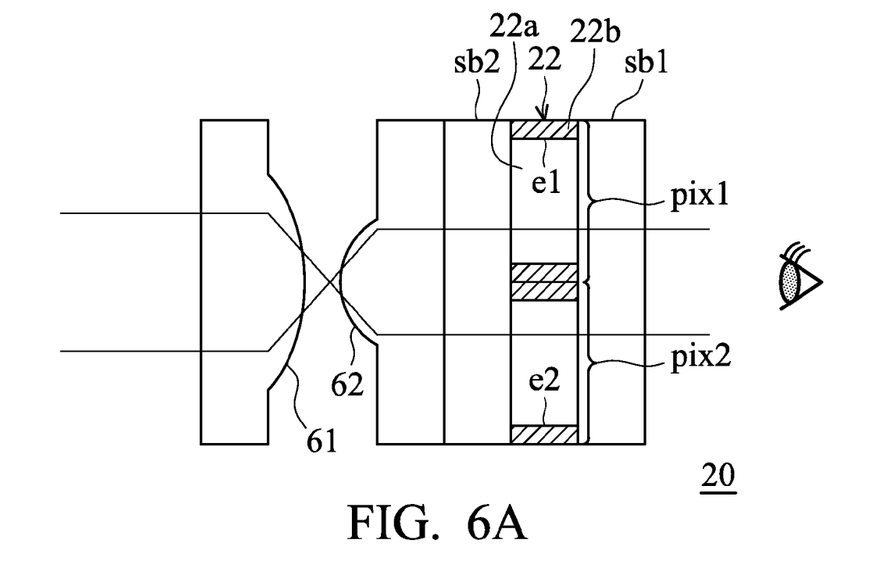
FIG. 6A shows a schematic diagram of light passing through the display structure according to an embodiment of the disclosure.

FIG. 6A shows a schematic diagram of light passing through the display structure according to an embodiment of the disclosure.

The difference between the display structures shown in FIG. 4A and FIG. 6A is that, in the embodiment shown in FIG. 6A, a pixel array includes a plurality of sub-pixel arrays, wherein each of the sub-pixel arrays includes at least one pixel, and each of the microlenses of the pixel array corresponds to one of the sub-pixel arrays of the pixel array. When each of the sub-pixel arrays only includes a pixel, the display structures shown in FIG. 4A and FIG. 6A are the same. The following description describes each of the sub-pixel arrays including more than two pixels.

Referring to FIG. 6A, the sub-pixel array includes two pixels pix1 and pix2. In other words, a microlens 61 of a first microlens array and a microlens 62 of a second microlens array are corresponding to the pixels pix1 and pix2, respectively. Light passes through the microlenses 61 and 62, and then focuses on the light-transparent region 22a of the pixel pix1 and the light-transparent region 22b of the pixel pix2. As a result, light come into the light-transparent regions does not pass through the edge e1 of the non-light-transparent region 22a and the edge e2 of the non-light-transparent region 22b, and the diffraction is reduced thereby.

Figure 6B:
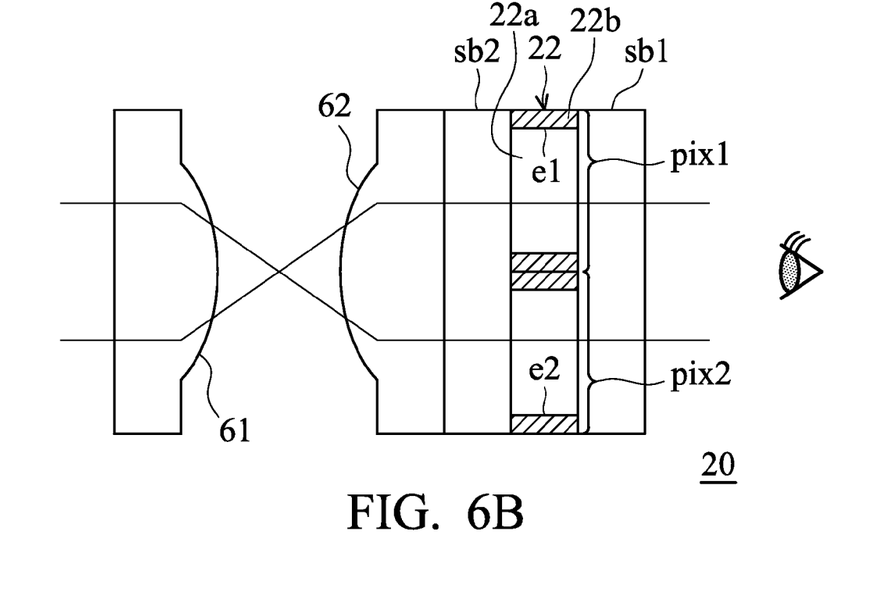
FIG. 6B shows a schematic diagram of light passing through the display structure according to an embodiment of the disclosure.

FIG. 6B shows a schematic diagram of light passing through the display structure according to an embodiment of the disclosure. The difference between the display structures shown in FIG. 6A and FIG. 6B is that, in FIG. 6B, the focal length f1 of the at least one microlens 61 of the first microlens array is equal to the focal length f2 of the at least one microlens 62 of the second microlens array. As a result, light coming into the light-transparent regions does not pass through the edge e1 of the non-light-transparent region 22a and the edge e2 of the non-light-transparent region 22b, and the diffraction is reduced thereby.

As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising". Moreover, the term "between" as used in this application is generally inclusive (e.g., "between A and B" includes inner edges of A and B).

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A display structure, comprising:
   a first substrate;
   a pixel array disposed on the first substrate to make each of the pixels of the pixel array comprise a light-transparent region and a non-light-transparent region;

a second substrate disposed on the pixel array; and
an optical component comprising:
   a surface; and
   a microlens structure comprising a microlens array, wherein each of a plurality of microlenses of the microlens structure corresponds to one of the pixels of the pixel array;
   wherein a vertical distance between the surface of the optical component and each of the non-light-transparent regions is less than twice as long as the focal length of each of the microlenses of the microlens array; and
   wherein light passes directly through the plurality of light-transparent regions without passing through the edge of the plurality of non-light-transparent regions after the light passes through the microlens structure.

2. A display structure, comprising:
a first substrate;
a pixel array disposed on the first substrate to make each of the pixels of the pixel array comprise a light-transparent region and a non-light-transparent region;
a second substrate disposed on the pixel array; and
an optical component comprising:
   a first plane;
   a second plane; and
   a microlens structure comprising a first microlens array and a second microlens array;
   wherein the focal length of at least one microlens of the first microlens array is a first focal length;
   wherein the focal length of at least one microlens of the second microlens array is a second focal length, and the second focal length is less than or equal to the first focal length;
   wherein each of a plurality of microlenses of the first microlens array corresponds to one of a plurality of microlenses of the second microlens array;
   wherein each of the microlenses of the second microlens array corresponds to one of the pixels of the pixel array;
   wherein the distance between the first and second planes is equal to the sum of the first and second focal lengths; and
   wherein light passes directly through the plurality of light-transparent regions without passing through the edge of the plurality of non-light-transparent regions after the light passes through the microlens structure.

3. The display structure of claim 1, wherein the optical component is made of water-blocking oxide film.

4. A display structure, comprising:
a first substrate;
a pixel array, disposed on the first substrate, comprising a plurality of sub-pixel arrays, wherein each of the sub-pixel arrays comprises at least one pixel, and each of the pixels comprises a light-transparent region and a non-light-transparent region;
a second substrate; and
an optical component, disposed on the second substrate, comprising:
   a plane; and
   a microlens array, wherein each of the microlenses of the microlens array corresponds to one of the sub-pixel arrays, and a vertical distance between the plane of the optical component and each of the non-light-transparent regions is less than twice as long as the focal length of each of the microlenses of the microlens array.

5. The display structure of claim 4, wherein each of the sub-pixels comprises a pixel, and each of the microlenses of the microlens array corresponds to one of the light-transparent regions.

6. The display structure of claim 4, wherein the optical component is made of a water-blocking oxide film.

7. A display structure, comprising:
a first substrate;
a pixel array, disposed on the first substrate, comprising a plurality of sub-pixel arrays, wherein each of the sub-pixel arrays comprises at least one pixel, and each of the pixels comprises a light-transparent region and a non-light-transparent region;
a second substrate disposed on the pixel array; and
an optical component, disposed on the second substrate, comprising:
   a first plane;
   a second plane;
   a first microlens array, wherein the focal length of at least one microlens of the first microlens array is a first focal length; and
   a second microlens array, wherein the focal length of at least one microlens of the second microlens array is a second focal length, and the second focal length is less than or equal to the first focal length; and
   wherein each of the microlenses of the first microlens array corresponds to one of the microlenses of the second microlens array, each of the microlenses of the second microlens array corresponds to one of the sub-pixels, and the distance between the first and second planes is equal to the sum of the first and second focal lengths.

8. The display structure of claim 7, wherein each of the sub-pixels comprises a pixel, and each of the microlenses of the second microlens array corresponds to one of the light-transparent regions.

9. The display structure of claim 7, wherein the optical component is made of a water-blocking oxide film.

10. The display structure of claim 2, wherein the optical component is made of water-blocking oxide film.

* * * * *